June 26, 1928. C. A. STOLTZ Re. 17,013

SOIL PULVERIZER

Original Filed Jan. 17, 1925 2 Sheets-Sheet 1

Inventor:

Cassius A. Stoltz;

By Robert W. Taudte,

Attorney.

June 26, 1928. C. A. STOLTZ Re. 17,013

SOIL PULVERIZER

Original Filed Jan. 17, 1925 2 Sheets-Sheet 2

Inventor:

Cassius A. Stoltz:

By Robert N. Landis,

Attorney.

Reissued June 26, 1928. Re. 17,013

UNITED STATES PATENT OFFICE.

CASSIUS A. STOLTZ, OF LAKEWOOD, OHIO, ASSIGNOR, BY MESNE ASSIGNMENTS, TO PLOW-MATE INC., A CORPORATION OF OHIO.

SOIL PULVERIZER.

Original No. 1,548,067, dated August 4, 1925, Serial No. 3,065, filed January 17, 1925. Application for reissue filed August 1, 1927. Serial No. 209,956.

This invention relates to soil tilling implements and particularly to an apparatus for use in connection with plows.

The general object of the invention is to provide a simple and efficient apparatus for use in conjunction with a plow for operating on the soil of the furrow slice as the same is being delivered by the mold board of the plow, to break up and pulverize the soil. A further object is to provide an apparatus of this character which will not materially increase the draft of the plow. A still further object is to provide an apparatus for longitudinally cutting and working the furrow slice, the primary elements of which apparatus will yield, when these elements encounter a fixed or refractory obstruction, sufficiently to prevent breakage of any of the parts of the apparatus, and yet which will automatically return to normal operative position after such yielding.

Further objects include an arrangement and shaping of soil slicing and pulverizing blades or knives, whereby material incapable of being cut by the blades will be easily passed through between the blades or so deflected as not to be dragged along with them. A further object of the invention is to provide a soil pulverizer including cutting blades in which the blades shall have substantially unitary lateral movement sufficient to clear obstructions, yet which will be prevented from downward movement such as would allow any of the blades to dig into soil yet untouched by the plow. Further objects include an arrangement of cutting blades, wherein the curvature of the blades follows the path of movement of the furrow slice and conform in general to the shape of such slice in order to act on the furrow in a uniform manner. A still further object is to provide a soil pulverizer which shall be simple in character, strong and durable in construction and which may be easily and quickly attached to and detached from the plow without disturbing any part of the plow and without having to perform such operations on the plow as, for example. drilling holes.

Further objects and features of the invention will become apparent from the following description relating to the accompanying drawings wherein I have shown my preferred form. The essential characteristics are summarized in the claims.

Figure 1:
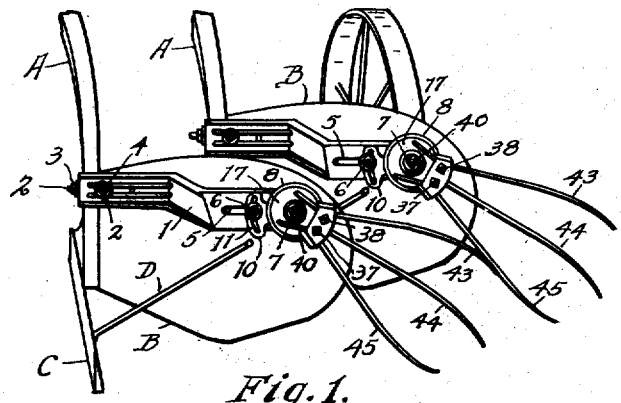
Figure 2:
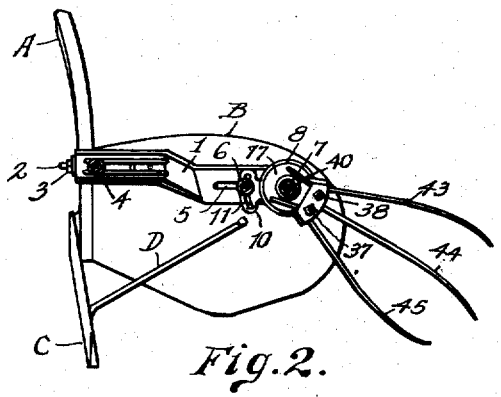
Figure 3:
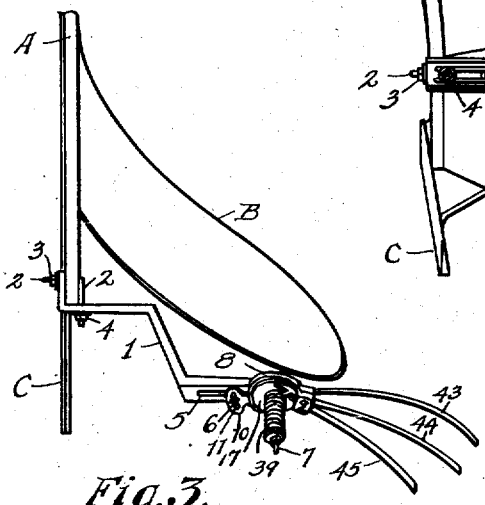
Figure 4:
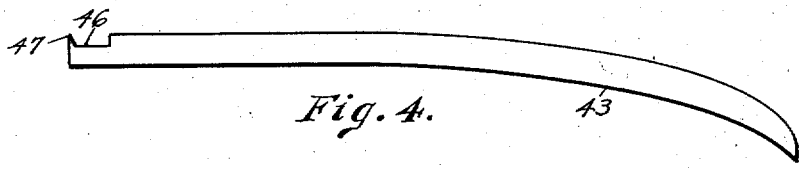
Figure 5:
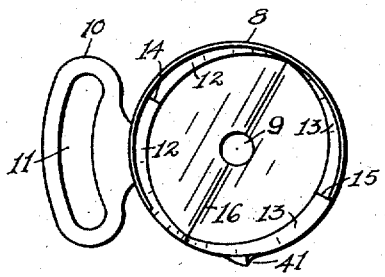
Figure 6:
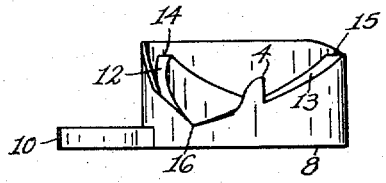
Figure 7:
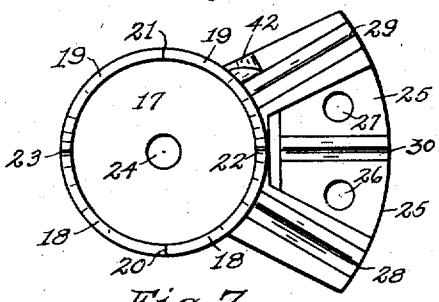
Figure 8:
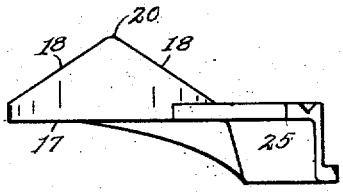
Figure 9:
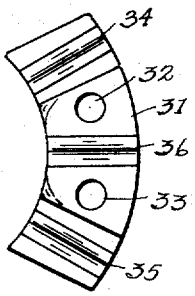
Figure 11:
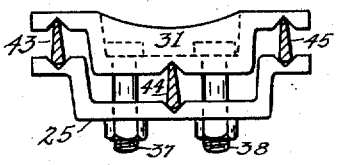
Figure 10:
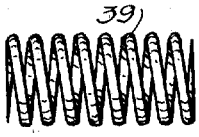

In the drawings, Fig. 1 is a perspective rear elevation of a portion of a double or two-furrow plow showing one of the devices attached to each of the plow beams; Fig. 2 shows the device as attached to a single plow beam, the position of the various parts being substantially as in Fig. 1; Fig. 3 is a fragmentary top plan view taken substantially at right angles to Fig. 2; Fig. 4 shows one of the blades alone; Fig. 5 is a plan view of one of the parts of the device embodying a face cam; Fig. 6 is a side elevation of the same part; Fig. 7 is a plan view of another part of the device showing the face of a cam arranged to cooperate with the cam shown in Fig. 5; Fig. 8 is a side elevation of the part shown in Fig. 7; Fig. 9 is a plan view of one of the parts of the blade clamping members; Fig. 10 shows a coil spring for maintaining the cams pressed toward each other in normal position; Fig. 11 is a sectional end elevation through the blades showing their relation and certain details of the blade clamping arrangement.

Referring in detail to the drawings and indicating the various parts by suitable characters, A in Figs. 1, 2 and 3 denotes the plow beam of the plow proper, and B the mold board of the plow. C denotes the land-side of the plow, the rear portion of which is connected to the mold board by a brace D. All of these parts are shown merely as illustrative of a common type of plow, and are illustrated to bring out the relation of the present improvement to these parts. It is to be understood that where terms, such as "beam", "mold-board", etc., are used in the specification and the appended claims, these terms are intended to mean any equivalent arrangement; for example, the term "beam" means a general frame or support for the plow parts, and the term "mold-board" any equivalent furrow turning or earth moving device.

To support the device rigidly in proper relation to the mold board, but without having to drill or otherwise molest the mold board, I provide a comparatively heavy arm 1 adapted for attachment to the plow beam at one end and to support the mounting for the cutting blades at the other. The arm may be made in various shapes to accommodate different makes and sizes of plows with which it is to be employed. The general direction of the arm should be such as to bring the slicing and pulverizing blades or knives to a position adjacent the delivery end of the mold board. As shown, the arm 1 is an elongated Z shape with the front end forming a right angle to contact with two adjacent sides of the plow beam. The front end portion of the arm 1 may be detachably connected to the substantially vertical portion of the plow beam A by means of a right angular bolt 2, both ends of which are shown as threaded to receive the respective nuts 3 and 4. The openings to receive the ends of the bolt 2 are preferably horizontal slots to accommodate various widths of beam and placements of openings in the beam for the transversely extending portion of the bolt. By this arrangement, the arm is very securely attached since it contacts along two sides of the beam. When the bolts are tightened, the arm occupies the position shown in Figs. 1, 2 and 3. Formed in the rear portion of the arm 1 and extending longitudinally thereof is a slot 5 to receive spaced apart bolts 6 and 7 for attaching the slicer and pulverizer proper to the arm, as will be presently shown.

The slicer and pulverizer, as shown, includes a three-part mounting and the blades. The member of the mounting shown in Figs. 5 and 6 comprises a circular base 8, the back of which rests upon the rearward face of the arm 1 with the bolt 7 extending through the aperture 9 formed centrally of the base. This member also has a laterally extending ear 10, the ear having a curved slot 11, through which passes the bolt 6. The slot permits rotative adjustment of the mounting member about the bolt 7 as a center.

The other member of the mounting shown in Figs. 7 and 8 has a circular base 17 placed in opposition to the base 8, and having a central opening 24 to receive the bolt 7. The adjacent faces of the two mounting members described have coacting face cams formed on arcs described about the axes of the central openings 9 and 24.

The various portions of the cams are as follows: The base 8 has two diametrically opposite extensions forming pairs of inclined cam faces 12 and 13. The faces 12 begin at a diametrical line 16 and meet at a high point 14, and the faces 13 begin at the line 16 and meet at a high point 15. The base 17 has a pair of cam faces 18 beginning at a diametral line passing through the low points 22 and 23 and rising to the high points 20, and a similar pair 19 beginning at 22 and 23 and rising to the high point 21. The diametral lines passing through the high and low points on the cams are at right angles and the faces incline at equal angles with reference to respective bases. Hence the cams match when the two members are assembled on the bolt 7. The high points 14 and 15 normally rest in the low points 23 and 22 respectively and the high points 20 and 21 rest in the depression at 16. A circular flange may be extended beyond the faces 12 and 13 to serve as a guard against dirt which might otherwise, in falling over the edge of the mold board, foul the cams.

The clamping means for the blades is as follows: The base 17 has formed integrally therewith and extending at one side thereof a sector shaped member 25, this member forming the base of the clamp. The central portion of the member 25 is raised rearwardly both for strength and to stagger the cutting blades, as will be presently shown. The sides of the member 25 have V-shaped channels 28 and 29 radiating substantially from the central opening in the base 17, and the central raised portion has one or more similar V-shaped channels, one being shown at 30. These channels receive the front edges of the shanks of the respective blades.

Cooperating with the member 25 to hold the blades is a clamping member 31, this being in the nature of a strap and made to conform in general to the forward face of the member 25. The rearwardly raised central portion of the strap substantially fits the depression in the forward face of the member 25 when in clamping position as shown. The member 25 and the member 31 have superposed openings, respectively designated 26—27 and 32—33, to receive clamping bolts 37 and 38, by which the two members 25 and 31 are drawn together on the blades. The member 31 has channels 34, 35 and 36 which are opposite the respective channels 28, 29 and 30 when the parts 25 and 31 are bolted together. The blades seat between the channels in the relation shown in Fig. 11. The blades are substantially identical in form at their bases and are designated 43, 44 and 45. Only one of the blades is illustrated in detail and this is indicated at 43 in Fig. 4. The other knives differ only in curvature and length. The blades are reduced in depth at 46 for the extent which they are engaged by the clamping members, and the extreme end of the reduced portion has a tooth 47 for engaging the inner edge of the clamping member 31 to prevent removal of the blades.

The positioning and curvature of the blades is determined by the action of the furrow slice as it leaves the mould board. This action is a rearward moving and twisting or spiral turning movement with reference to the mould board, the rearward movement being occasioned by the forward movement of the plow, and the twisting or turning movement by the camming action of the mould board on the soil. Assuming that the blades are placed just back of the mould board and properly set by adjusting the base 8 at 6 and 11, then the particular portion of a given furrow slice acted upon by the blades extends diagonally rearwardly to the right (in a right hand plow) and the surface toward the blades is somewhat convex due mainly to the fact that the slice is turning in a spiral. The blades are directed downwardly, about as shown, to cut into the slice at an oblique angle and before the slice has settled into place. Also it will be seen from Fig. 3 that the blades act in effect as a gradually receding continuation of the mould board wherefore the blades assist in completing the turning of the furrow slice. The rearward offset of the intermediate blade or blades, such as 44, results in that the blades, taken as a whole, conform substantially to the convexity of the furrow slice in order to act uniformly on the slice both in assisting the turning thereof, as mentioned, and in their slicing action.

It will be noted in Figs. 1 and 2 that the uppermost blade curves downwardly at its end, as does incidentally the intermediate blade 34, while the lowermost blade curves upwardly. The downward curvature is more important in the uppermost blade, from one standpoint, namely, in order to maintain this blade a uniform distance below the surface of the furrow slice throughout substantially its entire working length. If the upper and lower blades were straight, and positioned about as shown with relation to the intermediate blade to provide adequate clearance between the blades, the very ends of the upper and lower blades would under the usual plowing conditions, protrude from the furrow slice. The lower blade would in fact have to be very short in order to prevent it from digging into unplowed soil at the bottom of the furrow. If, instead of curving the blades, straight blades were to be used, the blade mounting would then have to be made much wider in order to provide sufficient clearance between the blades at their bases to allow the field rubbish of various sorts to readily dislodge from the blades and not be dragged along with them. Such wider mounting would not only result in additional weight and manufacturing expense but would, in numerous instances, have to extend beyond the edge of the mould board in such manner that it would produce draft by direct contact with the moving soil of the turned slice. The extreme rear edge or tail of the mould board is often very narrow, depending on the make and size of plow. Assuming straight blades at a less angle of divergence, widely enough separated to provide base clearance, and with the blades properly directed to follow the general direction of the slice and to prevent digging in, then the mounting would invariably rake along the soil below the forwardly retreating lower edge of the mould board.

The curvature of all the blades, particularly the extreme upper and lower ones, is perhaps even more important from the standpoint of effect on the soil to pulverize it. Since for the most part the curved blades all follow a right line movement, and since each blade engages the furrow slice at an acute angle, it will be apparent that the curved portions of the blades will not simply slice but will have a tendency to displace the soil. This results in considerable tearing action on the part of any curved portion buried in the furrow slice. This tearing action results in actually throwing and scattering the severed soil and therefore in pulverizing the soil to a great extent. The effect is to produce a surprisingly good planting surface at the top of the furrow including a general leveling off of the ground, and at the bottom of the furrow the displacement of earth results in eliminating the usual and undesirable air pockets. It may be well to note at this point that the curvature of the intermediate blade is less than that of the other two because it operates in the approximate center of the slice and therefore cannot tear through the slice as readily as the blades near the surface. The intermediate blade is preferably made longer than the others to reach substantially through the slice.

It would appear that the action of the blades above described would considerably increase the draft of the plow. The reason it does not so materially increase the draft is partly due to the fact that the blades are, by their shape and arrangement, assisting the mould board in completing the full turning of the furrow slice. Further, since the body of the slice has to be considerably stretched or torn apart in moving in a spiral path, it will be readily understood that any action tending to assist in disrupting the body, as by slicing it into strips will assist in decreasing the draft rather than act to increase it. The extra draft due to the tearing action of the curved blades merely subtracts, to an indeterminate degree, from the actual assistance rendered by the blades in slicing and turning as above set forth.

It will be readily understood that it is desirable to provide for more or less yielding of the blades in case the blades encounter obstructions which cannot be cut or moved. The primary purpose of the cam arrangement previously described, is to guide the blades back to normal position after such yielding. The cams are maintained pressed toward each other by a spring 39 loosely surrounding the bolt 7 and held in compressed condition by reason of a nut engaging threads on the end of the bolt 7. The spring allows the base 17 to travel along the bolt in case such obstructions are encountered. The yielding of the blades may be regulated by moving the nut in or out on the bolt 7, as required by soil conditions. For example in plowing light soil the spring does not need to afford so much compression in order to hold the blades in their normal position in which case the nut is moved outwardly to partially release the spring. As shown, the blades may yield in the general direction of cutting or in a transverse direction. Usually the blades encounter an obstruction with a glancing blow and in such case if the blow tends to move the blade about the pivot center, namely the bolt 7 in an upward direction the cam faces ride up on each other, the spring being compressed to allow this, and then as the obstruction is passed the spring reacts on the cams to return the blades to their original position. Rotative movement in a downward direction is prevented however, by reason of stops 41 and 42 formed on the bases 8 and 17 respectively. The stop 41 rises adjacent the inclined face 13 but off-set outwardly to engage the stop 42 which, as shown, is part of the member 45 forming the clamp. This cooperates with the upward curve of the blade 45 to prevent this blade or in fact any of the blades from digging into unplowed ground below the furrow slice. In addition to the direct rearward and the transverse yielding of the blades as above described, the blades may, of course, have some rearward canting action by reason of loose fit between the aperture 24 and the bolt. Such loose fitting of parts is common practice in agricultural implements and is therefore not illustrated.

From the above description, it will be seen that I have provided a soil pulverizer for use in connection with breaking plows which will operate uniformly on the furrow slice as it is being turned by the mould board to break up and pulverize the soil without substantially interfering with the normal action of the plow. It will be further seen that my device will act to aid the complete turning of the furrow while pulverizing the soil, wherefore rolling or dragging operations or the like will not ordinarily be required in preparing a seed bed. Furthermore, it will be seen that by operating throughout the entire furrow slice in the manner described, the arrangement permits the cut and otherwise disrupted furrow to settle completely into place at the time of plowing, thereby eliminating air pockets without necessitating any rolling operation for packing. It will be further seen that by my arrangement I have provided against breakage of the parts by reason of permitting the blades to yield under excessive strain, and at the same time I have provided a simple means for returning the primary elements, namely the blades, to their normal operating positions after such yielding. It will be further seen that the whole device is very strong and compact, easily attached to the plow free from the mould board, well adapted to agricultural use, and capable of considerable adjustment in order to fit the various makes, sizes and designs of plows. It is to be understood that various changes may be made in the general details of the apparatus without departing from the intended scope of the invention.

I claim:—

1. In a plow having a plow-beam and mold board, an arm secured to the beam, a soil slicer and pulverizer comprising a plurality of elongated blades and a mounting therefor, the mounting being arranged to yield rearwardly with reference to the arm, and resilient means to oppose such yielding movement and to return the mounting to its original position.

2. In combination with a plow, having a mold-board, a soil slicer and pulverizer comprising a plurality of slicing blades extending rearwardly from the mold-board and outwardly to cut into the furrow slice as the same is delivered by the mold-board, a mounting for the blades movable in intersecting planes, and a rigid support for the mounting, the mounting being resiliently stressed to normally maintain it in a definite position on the support, and means for guiding the mounting toward such definite position.

3. In a plow having a plow-beam and mold-board, an arm connected at one end to the plow-beam and extending adjacent the rear edge of the mold-board, a pulverizer comprising a plurality of blades, and a position adapter for attaching the blades to the arm and including a mounting for the blades, the mounting having rotary and axial movement with reference to the arm, and resilient means restraining such movement.

4. In a breaking plow of the class described, a rigid support, a plurality of elongated blades disposed at the delivery end of the mold-board of the plow, a mounting for the blades pivotally carried by the support the pivotal axis extending in the direction of plowing, the mounting having a yielding connection with the support to allow an abnormal bodily movement of the blades, and means acted on by said yielding connection to normally maintain the mounting in a definite position relative to the support.

5. In a plow, a plow-beam, a mold-board, an arm rigid with the plow-beam and having its free end extending adjacent the delivery end of the mold-board, a pulverizer comprising a plurality of elongated cutting blades substantially rigid with each other, a position adapter comprising two members, one being adjustably rigid with the arm and the other being movable relative to the arm while the pulverizer is in operation, and forming a mounting for the blades, and spring means normally tending to hold the adapter members in a definite relative position.

6. In combination with a plow, having a mold-board and a support therefor, a soil slicer and pulverizer comprising a plurality of cutting blades carried by said support and a mounting for the blades arranged to permit the blades to yield transversely with reference to respective cutting planes while remaining in active engagement with the furrow slice and means to restrain such yielding and to normally maintain the blades in a definite position.

7. In combination with a plow having a plow-beam and mold-board, an arm connected at one end to the beam and having its free end disposed near the delivery end of the mold-board, a soil slicing and pulverizing device comprising a plurality of elongated cutting blades, a position adapter therefor for connecting the device to the free end of the arm, said adapter comprising a stationary part and a movable part, the movable part having a normal operating position with reference to the stationary part and means to resiliently maintain said movable part in such normal position.

8. In a plow of the class described, a support carried by the plow, a pulverizer carried by the support, said pulverizer being disposed near the delivery end of the mold-board and comprising a plurality of elongated blades extending diagonally rearwardly from the mold-board, a position adapter for the pulverizer attached to the support and arranged to permit the blades to move in a rearward direction with reference to the path of movement of the plow and also transversely to respective cutting planes of the blades, and means associated with the adapter for preventing such transverse movement of the blades in one direction from their normal position.

9. In a plow having a plow beam and mold-board, an arm connected at one end to the plow beam, said arm being disposed on the inactive side of the mold-board and extending to a point adjacent the rear edge of the mold-board, a pulverizer comprising a plurality of blades and a supporting member therefor, said supporting member being rotatively adjustable relative to the arm to vary the inclination of the blades toward and from a horizontal plane, and a yielding connection between the blades and the supporting member.

10. A soil pulverizing device comprising a mounting adapted to be positioned near the rear or delivery edge of the mold-board of the plow, a plurality of soil cutting blades carried by the mounting, said blades extending past the rear edge of the mold-board and inclining rearwardly, the uppermost blade curving downwardly at the end thereof and the lowermost blade curving upwardly at the end thereof there being a blade intermediate said upper and lower blades having its cutting edge disposed rearwardly materially out of the general plane of the cutting edges of the upper and lower blades.

11. A soil pulverizing device comprising a plurality of soil cutting blades and a mounting for holding the blades, said blades being adapted to extend adjacent the rear edge of the mold-board of a plow and inclining rearwardly, the uppermost blade curving downwardly at its end and the lowermost blade curving upwardly at its end, there being a blade intermediate the the upper and lower blades extending past the tips of said upper and lower blades for the purpose specified.

12. In a plow, a rigid support, clamping means carried thereby, a plurality of blades supported in the clamping means and extending rearwardly and laterally from the mold-board of the plow, the extreme upper blade being bowed upwardly with its extreme end pointing downwardly, the curve of the blade substantially corresponding to the upper surface of the furrow slice as it leaves the mold-board, whereby said upper blade will cut into the furrow slice uniformly throughout substantially its entire working length, and said upper blade being positioned forwardly from the adjacent blade whereby the cutting action of such adjacent blade will be unopposed by the operation of said upper blade.

13. In a plow, a plurality of blades, a mounting therefor arranged to hold the blades in active engagement with the soil as the same is being turned by the plow, there being an upper blade curved downwardly at its end to conform to the shape of the furrow slice, and a lower blade curving upwardly whereby the blades may diverge at a generous angle at their shank portions to increase the distance between the blades and whereby the extremities of the blades will be maintained within the furrow slice.

14. In a plow, a support rigid with the plow, said support having a portion extending adjacent the rear edge of the mold-board, a mounting carried by said support and provided with a clamp, a plurality of blades maintained in a generally diverging arrangement by said clamp and extending outwardly and rearwardly past the rear edge of the mold-board, the uppermost blade being gradually curved downwardly at its end to cause it to cut into the crest of a furrow slice delivered by the mold-board and to bury itself uniformly in such furrow slice, and means for preventing the lowermost blade from engaging unplowed soil.

15. In combination with a plow-beam having a mold-board connected thereto, an arm detachably connected at its forward end with the plow beam, a hand pivoted to and connected by cam means with the rear end of the arm, spring means for retaining the hand in normal position but permitting it to turn on its pivot and causing the cam means to return the hand to normal position after being turned therefrom, and a plurality of blades extending rearwardly from said hand.

16. In combination with a plow-beam having a mold-board in connection therewith, an arm connected at its forward end to the plow-beam and extending rearward back of the mold-board without connection therewith, a hand pivoted to the rear end of said arm, cam means for permitting the hand to turn out of normal position, a spring for automatically returning the hand to normal position in the cam means, blades detachably secured in the hand and extending rearwardly and curving into the path of the furrow slice delivered by the mold-board.

17. A soil pulverizer comprising an arm, cam means comprising a female member adjustably secured to said arm and a male member adapted to rotate in connection with the female member, resilient means for retaining said members in contact with each other, a pivot concentric with the female member, the male member, and said resilient means, and means for limiting the rotation of one of said members in one direction with relation to the other member, a clamping hand carried by the male member, and a plurality of blades detachably secured by said clamping hand.

18. A soil pulverizer for plows comprising a support adapted to be rigidly carried by the plow, a plurality of blades positioned to engage the soil as the same is being turned by the plow, and a position adapter for the blades comprising two coaxially pivoted members, one adjustably rigid with the support and the other movable relative to the support while the pulverizer is in operation, the latter member carrying the blades, and yielding means tending to hold the said members in a definite relative position.

19. A soil pulverizer for plows, comprising, a support adapted to be rigidly attached to the plow, a plurality of blades positioned and arranged to constantly act to cut into the soil turned by the plow, said blades being movable transversely of respective cutting planes, and yielding means restraining such movement.

20. A soil pulverizer for plows comprising a support, a plurality of blades and a holder therefor carried by the support and movable relative thereto transversely of the respective cutting planes of the blades, yielding means for restraining such movement in one direction from a definite position, and abutment means between the holder and support for restraining such movement in the opposite direction.

21. In a soil pulverizer for plows, a plurality of elongated blades disposed adjacent the soil turning element of the plow and positioned to engage the soil while being turned thereby, there being upper and lower blades and an intermediate blade, the latter having its cutting edge disposed rearwardly from the cutting edges of both the upper and lower blades.

22. A soil pulverizer for a plow having a plow beam and mold-board, comprising in combination a plurality of cutting blades disposed adjacent the mold-board of the plow and arranged to cut into the furrow slice as the same leaves the mold-board, and an arm secured to the plow beam for supporting the blades, there being resilient means associated with the arm and positioned between the point of attachment of the arm and the blades for normally holding the blades in a definite position relative to the mold-board while permitting the blades to yield rearwardly under excessive strain.

Signed at Cleveland this 23rd day of July 1927.

CASSIUS A. STOLTZ.